United States Patent Office 3,539,467
Patented Nov. 10, 1970

3,539,467
HOT BRIQUETTING AND OXIDATION OF COAL-PITCH MIXTURES IN PREPARING ACTIVATED CARBON
Abe Roscoe Bozarth, Cleveland, Ohio, and Edward A. Blaine, Mountainside, N.J., assignors to Kewanee Oil Company, Bryn Mawr, Pa., a corporation of Delaware
No Drawing. Filed Nov. 30, 1967, Ser. No. 686,789
Int. Cl. C01b *31/08*
U.S. Cl. 252—435                   2 Claims

ABSTRACT OF THE DISCLOSURE

A process for the preparation of granular activated carbon from coal which comprises hot briquetting of the coal together with pitch, comminuting said briquettes, oxidation, carbonization and activation of the granules to form granules of activated carbon having improved hardness to better resist attrition and reduced pore volume in the greater than 10,000A range as well as increased density.

SUMMARY

This invention relates generally to the manufacture of granular activated carbon and more particularly to the manufacture of granular activated carbon from coal granules.

It is an object of this invention to produce granular activated carbon which possesses the folowing advantageous properties: (1) Increased hardness which reduces disintegration and deterioration in its various applications; (2) Reduced pore volume in the >10,000° A. range and increased particle density. These improved properties remarkably improve the capacity and efficiency of the resulting activated carbon.

Another object of this invention is to prepare coal feed granules of increased hardness and whose rate of attrition is effectively minimized resulting in longer life under equivalent use and regeneration conditions.

Still a further object of this invention is to describe a process having improved capacity which requires a lower capital investment in manufacturing equipment.

Activated carbon describes carbons which have been specifically prepared so as to produce high surface area so as to maximize the adsorption capacity of the carbon. The uses of activated carbon are many, and are used extensively in adsorbing gases or vapors, decolorizing and purifying liquids, catalysts and catalyst carriers and in medicine. Typical examples of the use of activated carbon in adsorbing gas include its use in gas masks, recovery of gasoline from natural gas, recovery of solvents vaporized in industrial processes and removing impurities from gases. Activated carbon is also used in the manufacture of phosgene (catalyst) and as a carrier of hydrogenation catalysts and the like. In medicine, activated carbon can be used as an internal medicine for adsorption of gases, toxins and poisions, for administering adsorbed medicinals, or as an external absorbent for odors from ulcers or wounds. Decolorizing and purifying of liquids is another important area for activated carbons and one for which the instant invention is most suitable. Typical examples in this area of utility include the refining of cane sugar, beet sugar, glucose and other sirups; refining oils, fats and waxes; removing impurities from food products, pharmaceutical and other chemical products; water purification and the like.

Activated carbon can be made from a number of starting materials and the preferred use of activated carbons usually depends on the choice of starting materials. In the general preparation of activated carbons, the carbonaceous starting material ir first pulverized or comminuted to appropriate particle size. These resulting particles can then be directly activated or they may be first pressed to desired shapes followed by the normal activation procedure. Examples of the prior art shaping consisted entirely of cold pressing of large blocks of material.

These shaped or unshaped particles then are usually oxidized and heated in an air atmosphere according to the standard practice followed by carbonization which is essentially heating to a higher temperature than the oxidation step but in an inert atmosphere. The oxidation and carbonization step is then followed by a so-called activation step wherein the oxidized and carbonized material is heated in a steam atmosphere.

The granular activated carbon of the instant invention is highly resistant to attrition and is most useful in the purification of liquids wherein regeneration of the activated carbon is necessary which in turn requires an attrition resistant activated carbon. Of particular interest is the use of the activated carbon of the instant invention in the decolorization and refining of sugar solutions. The prime source of activated carbon for this use to date has been made from bone char.

The carbonaceous material of the instant invention is a medium to medium-high volatile coal and the resulting activated carbon has physical and chemical properties which make it highly attrition resistant and highly active as an adsorbent. Activated carbons have been made from coal in the past. However, to applicant's knowledge, the process of the instant invention which results in the improved properties, has never been practiced and will be described in detail as follows.

The preparation of granular activated carbon from coal is a complex multi-step operation. The composition of the starting material can vary widely as in fact coal from various areas does vary widely as to ash content, percent volatiles and percent fixed carbon. However, it is preferable to utilize coal having a low ash content, medium to medium-high volatility and a high fixed carbon content. After the appropriate coal is chosen, this raw coal is pulverized. This can be done in any manner, as for example a bowl mill or other commercial pulverizing equipment which will economically grind the pulverized raw coal to approximately 325 mesh or lower. Of course, the size of the pulverized coal can vary widely and need not be less than 325 mesh.

The pulverized coal is then mixed with a small amount of high melting (180 to 250° F.) coal tar pitch which operates as a binder for the coal particles. The quantity of pitch used to bind the quantity of coal materials can vary widely. However, for most purposes, the amount of pitch utilized should be in the range of 5–10 percent by weight, preferably 6–8 percent by weight. Seven percent pitch appears to be ideal when using a West Virginia coal designated "Imperial" which contains about 31% volatiles.

The mixed pulverized coal and pitch are then pressed or formed in some desirable shape so that granules can be made therefrom for further processing. A prior art commercial process used a hydraulic press to form 30 pound cubes of the pressed mixture. The instant invention however, requires a hot pressure formation step. Any apparatus for effecting this hot pressing of pulverized coal pitch mixture will be effective for the present process. For instance, the pulverized coal pitch mixture can be steam heated and then briquetted while hot in standard briquetting equipment. Alternatively, a press such as that used in the prior art method can be used so long as the material being pressed is heated to an appropriate temperature. Another alternative method would be to extrude the heated pulverized coal pitch mixture.

The heating involved in this process should be sufficient to cause softening or partial melting of the pitch. Obviously, the degree of heating will depend on the pitch used in the process or the temperature to which the mixed material is heated can vary. It can, in some instances, be as low as 80° C. or as high as 110° C. Preferably, however, the pitch containing mixture is heated to a temperature in the range 90–105° C. The preferred method of heating the mixture is to use steam at either atmospheric or superatmospheric temperatures. The main point is as stated before that the pitch in the mixture is at least partially in the softened or molten condition and such minimum temperatures would be obvious to those practicing the invention based on the particular coal tar distillate utilized.

The shaped pulverized coal pitch mixture is then fractured into smaller fragments by a granulation procedure. The size should approximate that desired in the finished activated carbon and can vary widely depending on the product desired. Generally, the particle size will be between 4 and 50 mesh.

The granulated material is then subjected to an oxidation step. The oxidation step consists of heating the granules in an air atmosphere at temperatures between 140 and 400° C. so as to at least partially destroy the swelling and caking properties inherent in the raw coal. Following the oxidation step, the oxidized granules are given a second thermal treatment known as carbonization. This thermal treatment takes place in a neutral atmosphere and its purpose is to remove volatile organic material present in the oxidized coal and to convert various volatile substances into non-volatile fixed carbon residues. The temperature employed in this carbonization step should be a temperature above the resolidification temperature of the coal and usually falls in the raneg of approximately 600 and 750° C. in commercial operations.

The oxidized and carbonized granules are then subjected to an activation step which in effect is a third thermal treatment for the granules and consists of heating the oxidized and carbonized granules in a predominantly steam atmosphere at temperatures in the range of approximately 900–1000° C. The purpose of this step is to fully develop the surface area and porosity of the granules and then involves the removal of the fixed carbon by the conversion of the same into carbon monoxide and carbon dioxide. All of the above mentioned thermal treatments can be carried out in rotary furnaces, Herreschoff furnaces or other commerciallly available heating equipment.

The process of the present invention is differentiated from the various prior art processes by the by the hot pressing of the pulverized coal pitch mixture. This hot briquetting produces materials of greater hardness and attrition resistance. These improved properties follow through the entire process and are characteristic of the finished activated carbon produced from such a process. In addition, the present process results in an activated carbon in which there is a sharp decrease in the number of pores in the >10,000° A. size range. This reduction in the large pores increases the density of the carbon but does not decrease its adsorbent properties as the pores of this size do not contribute to the adsorbency of the activated carbon.

A typical preparation under the practice of the present invention will now be described in detail. As stated earlier, a medium to medium-high volatility coal is preferred for the manufacture of activated carbon by the present invention. One such coal is found in West Virginia and is termed "Imperial". Such coal was pulverized in a bowl mill to a minimum particle size of 325 mesh. This pulverized coal was then mixed with 7% pitch and blended in a ribbon blender and then heated with steam and compacted while hot into briquettes by standard briquette machinery. The resulting briquettes are then granulated to form granules of less than ¼ inch diameter. These granules have extremely high hardness and attrition characteristics. By comparison, granules made in the same manner but substituting a cold higher pressure briquetting for the hot briquetting of the instant invention produced granules having very poor attrition and hardness properties which greatly reduces the yield of the process. It should also be noted that the attrition and hardness characteristics of the hot briquetted material are retained throughout all processing steps and is characteristic of the activated carbon granules produced by the instant invention.

In addition to the attrition characteristics, there appears to be a relationship between the macropore structure (>10,000° A.) and the mode of preparation. The present invention results in a decrease in pore volume in this macropore range and results in increased particle density without detrimentally affecting the adsorption capability of the activated carbon. Cold pressing, however, resulted in material having a much higher macropore structure and lower particle density along with the inherent poor attrition characteristics.

The granules obtained from granulating the hot briquetted coal pitch mixture were then placed in a Herreschoff furnace and then subjected to a low temperature oxidation conducted in the range of 150–200° C. followed by a high temperature oxidation conducted in the range of 3°°–425° C. In this multi-hearth furnace the low temperature oxidation was conducted in the first five hearths and the high temperature oxidation conducted in the last three hearths. The residence time for the overall oxidation was approximately 3½ hours. This residence time can vary widely depending on the starting materials and the desired end use of the activated carbon. It should be noted that rotary furnaces may be used in place of Herreschoff furnaces. In face, continuous rotary furnaces would be superior in many respects to the Herreschoff furnace because of its characteristic temperature time profile combined with the simplicity and ease of operation.

The oxidizer material is then carbonized in a Herreschoff furnace and in the carbonization step the temperature of the granular material is gradually raised to approximately 900° C. In this particular run the hearths in the Herreschoff furnace were maintained at temperatures as follows:

| Hearth No.: | Hearth temp. ° C. |
|---|---|
| 1 | 260–292 |
| 2 | 335–380 |
| 3 | 465–536 |
| 4 | 560–620 |
| 5 | 705–756 |
| 6 | 780–810 |
| 7 | 845–865 |
| 8 | 870–912 |

The relatively low temperature in hearths one and two was due to the fact that the granular material being fed to the carbonization step contained a high volatile content. When feed material has lower volatile content the temperature in hearths one and two can be raised substantially without detrimentally affecting the product. Here again, a continuous rotary furnace could be substituted for a Herreschoff furnace.

The carbonized material was then activated in a Herreschoff furnace. The function of this step is to develop the surface area pore volume and pore volume distribution which are the necessary properties of the adsorbent. In this activation step the oxidized material is heated to approximately 1000° C. in the presence of steam. Air may also be admitted to the activation area and it will function so as to increase the gasification rate. In this particular run the activation conditions were as follows:

| Hearth No.: | Hearth temp., ° C. |
|---|---|
| 1 | 895–915 |
| 2 | 960–962 |
| 3 | 983–992 |
| 4 | 980–988 |
| 5 | 978–985 |
| 6 | 990–995 |
| 7 | 985–996 |
| 8 | 995–1000 |

The products obtained from this run was a highly active activated carbon which had improved attrition resistance as well as having better pore volume distribution.

All of the discussions of process to date regarding the preparation of the coal-feed material has mentioned merely the mixing of pulverized coal and pitch. In actual practice, recycle material from other parts of the process comprising fines and small fragments can make up part of the pulverized coal pitch mixture and has been successfully operated with up to 50% of the material being recycled material. The amount of recycle material apparently has no effect whatsoever on the ultimate hardness, attrition resistance or pore volume distribution as long as the recycle material was originally formed by hot pressure operation.

In order to demonstrate the improved properties of the activated carbon made by the present invention, applicant's prepared activated carbon by the cold press method and compared the same to corresponding hot pressed material.

EXAMPLE I

Both hot pressed coal feed granules and coal feed granules pressed at ambient temperatures are prepared for comparison purposes. They were then oxidized, carbonized and activated in similar manner.

In preparing the carbonization material for ambient temperature pressing 89 parts of crushed coal was blended with 7 parts pitch and four parts water. This mixture was then ground until 80% of the material passed thru a 325 mesh screen. The mixture was then blended thru a six foot ribbon mixer with varying proportions of briquette and screen recycle material. The blend was then briquetted into one inch briquettes at ambient temperature. This was followed by granulating these briquettes to roughly 12–28 mesh.

In the manufacture of the comparable granulated material of the instant invention, the same procedure was followed using the same equipment with only the following exceptions.

(1) The addition of the four parts water to the pitch was omitted since this was not necessary since the moisture content was raised to the 3 to 8% range by direct steam heating.

(2) A steam jacket heater was installed on the ribbon mixer and steam was also passed concurrently with the coal pitch water mixture thru the ribbon mixer to the extent of a small exit plume. This steam heat was sufficient to raise the exit material temperature to 90–95+ ° C. and contained 3–8% moisture. The results of the comparative testing is given in the following table.

Table I shows the percent dust formation obtained by ambient briquetting as opposed to hot briquetting. This property carries throughout the process and remains with the finished product. The test is based on the dust formation or attrition measured by the attrition-stirring method (see Revised Text Procedure for Abrasion Hardness, 1957, Technical Session on Bone Char., Appendix IX, p. 124–7). Results of several such runs are given in the following table.

TABLE I.—PERCENT DUST FORMATION

| Run No. | Coal-feed granules | | Run No. | Oxidized granules | |
|---|---|---|---|---|---|
| | Ambient briquetting | Hot briquetting | | Ambient briquetting | Hot briquetting |
| A | 29 | 16 | 1 | 29.6 | 16.4 |
| B | 26.7 | 6.7 | 2 | 21.9 | 10.9 |
| C | 25.7 | 6.0 | 3 | 28.3 | 11.0 |
| D | 28.8 | 8.0 | 4 | 26.7 | 12.8 |

The hardness of the final product also follows the same relationship as regards to dust formation as shown from the following runs.

TABLE II.—PERCENT DUST FORMATION—FINAL PRODUCT

| Run No. | Ambient briquetting | Run No. | Hot briquetting |
|---|---|---|---|
| 1 | 28.5 | A | 11.0 |
| 2 | 25.0 | B | 12.3 |
| 3 | 28.1 | C | 11.0 |
| 4 | 27.1 | D | 13.0 |
| | | E | 11.0 |
| | | F | 13.4 |

In connection with the above, it should be pointed out at this time that for activated carbon used in sugar decolorization the preferred value for dust formation should not exceed 17%.

Another improvement in the resulting material by the practice of the instant invention is the particle density and pore volume distribution. It has been known that pores >10,000° A. contribute little, or nothing to the adsorbability of activated carbon. In fact, when so reduced the hardness and density of the carbon is improved. The hot briquetting technique of the instant invention results in a substantial decrease in pores whose size ranges over 10,000° A. In addition, this results in a significant increase in particle density. This decrease in the macropores has no adverse affect on pore volume distribution in the size range essential to the adsorptive properties of the carbon. This is demonstrated in Table III that follows.

TABLE III.—EFFECT OF HOT BRIQUETTING ON PORE VOLUME>10,000° A. AND PARTICLE DENSITY

| Run No. | Ambient temp. briquetting | | | Hot briquetting | | | | | |
|---|---|---|---|---|---|---|---|---|---|
| | 1 | 2 | 3 | A | B | C | D | E | F |
| Molasses ratio [1] | 103 | 114 | 118 | 108 | 110 | 129 | 104 | 107 | 110 |
| Surface area, m.²/g | 1,074 | 1,100 | 1,112 | 991 | 990 | 1,018 | 928 | 959 | 1,051 |
| Particle density, g./cc | .68 | .66 | .68 | .78 | .75 | .73 | .77 | .76 | .72 |
| Pore volume, cc./g | 1.01 | 1.05 | 1.01 | .80 | .87 | .91 | .83 | .87 | .92 |
| Pore volume distribution, cc./g.: | | | | | | | | | |
| 20° A | .376 | .385 | .389 | .347 | .347 | .356 | .325 | .336 | .368 |
| 20–100° A | .154 | .165 | .131 | .063 | .113 | .124 | .105 | .124 | .112 |
| 120–200° A | .04 | .04 | .04 | .04 | .04 | .05 | .04 | .04 | 0.5 |
| 200–350° A | .03 | .03 | .03 | .03 | .03 | .03 | .02 | .03 | .03 |
| 350–700° A | .03 | .03 | .03 | .02 | .03 | .03 | .03 | .03 | .03 |
| 700–1000° A | .02 | .02 | .02 | .02 | .01 | .02 | .01 | .02 | .02 |
| 1,000–10,000° A | .19 | .20 | .20 | .19 | .22 | .22 | .20 | .21 | .22 |
| >10,000° A | .17 | .17 | .17 | .09 | .08 | .08 | .10 | .08 | .09 |

[1] Molasses ratio is the ratio of the sugar decolorizing capability of an activated carbon compared to that of a standard sample of commercial acceptability by comparative colorimetric tests multiplied by 100.

The reduction in pore volume >10,000° A. averaged out to approximately 0.077 cc. per gram and this would be equivalent to an increase in density of 0.046 grams per cc. or 6 to 8%. This increase in particle density although small is an important product property since it represents an equivalent increase in capacity in adsorbent beds in various applications for which the various carbon product is used.

The foregoing discussion is merely illustrative of the instant invention. Many modifications thereof will be obvious to the skilled artisan. Thus, the foregoing discussion should not be considered limiting applicant's invention except as limited in the claims that follow.

We claim:

1. A process for the preparation of granular activated carbon of improved attrition resistance from pulverized coal comprising:
   (1) blending said pulverized coal from the group consisting of medium volatile and medium-high volatile coal with from about 5 to 10% by weight pitch,
   (2) heating the pulverized coal pitch mixture to a temperature in the range of about 80–110° C. so as to at least partially convert the pitch to the softened or molten state,
   (3) briquetting said mixture while still in said softened or partially molten condition,
   (4) granulating the briquettes so formed so that the granules pass a 4 mesh screen,
   (5) oxidizing the granules at temperatures between 140 and 400° C.
   (6) carbonizing said oxidized granules, and
   (7) activating said oxidized and carbonized granules at an elevated temperature in the presence of steam.

2. A process for the preparation of granular activated carbon of improved attrition resistance from pulverized coal of about 325 mesh comprising:
   (1) blending said pulverized coal from the group consisting of medium volatile and medium-high volatile coal along with up to about 50% fines and fragments recycled from process steps (3), (4), (5), (6) and (7) with from about 5 to 10% by weight pitch,
   (2) heating the pulverized coal pitch mixture to a temperature in the range of about 90–105° C. so as to at least partially convert the pitch to the softened or molten state,
   (3) briquetting said mixture while still in said partially molten condition,
   (4) granulating the briquettes so formed to form granules in a size range of about 4 to 50 mesh,
   (5) oxidizing the granules at temperatures between 140 and 400° C.,
   (6) carbonizing said oxidized granules, and
   (7) activating said oxidized and carbonized granules at an elevated temperature in the presence of steam.

References Cited

UNITED STATES PATENTS

| | | | |
|---|---|---|---|
| 2,008,146 | 7/1935 | Morrell | 252—445 |
| 2,824,790 | 2/1958 | Gregory et al. | 201—5 XR |

DANIEL E. WYMAN, Primary Examiner

P. E. KONOPKA, Assistant Examiner

U.S. Cl. X.R.

201—6, 8, 9, 23; 252—445